United States Patent
Kelly et al.

(10) Patent No.: US 12,444,514 B2
(45) Date of Patent: Oct. 14, 2025

(54) CALIBRATION OF POWER MONITORS IN MOLTEN SALT REACTORS

(71) Applicants: ABILENE CHRISTIAN UNIVERSITY, Abilene, TX (US); GEORGIA TECH RESEARCH CORPORATION, Atlanta, GA (US); The Texas A&M University System, College Station, TX (US); Board of Regents, The University of Texas System, Austin, TX (US)

(72) Inventors: Ryan Kelly, College Station, TX (US); Steven Biegalski, Atlanta, GA (US); Ryan Brownfield, College Station, TX (US); Kraig Farrar, College Station, TX (US); Jonathan Tyler Gates, College Station, TX (US); Derek Haas, Austin, TX (US); Jonathan Scherr, Abilene, TX (US); Jack Shoemate, Abilene, TX (US); Pavel Tsvetkov, College Station, TX (US)

(73) Assignees: Abilene Christian University, Abilene, TX (US); Georgia Tech Research Corporation, Atlanta, GA (US); The Texas A&M University System, College Station, TX (US); Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 18/795,873

(22) Filed: Aug. 6, 2024

(65) Prior Publication Data
US 2025/0054648 A1 Feb. 13, 2025

Related U.S. Application Data

(60) Provisional application No. 63/518,021, filed on Aug. 7, 2023.

(51) Int. Cl.
G21C 17/108 (2006.01)
G21C 17/02 (2006.01)

(52) U.S. Cl.
CPC .......... *G21C 17/108* (2013.01); *G21C 17/02* (2013.01)

(58) Field of Classification Search
None
See application file for complete search history.

(56) References Cited

U.S. PATENT DOCUMENTS 2,874,106 A 2/1959 Phillip
3,303,691 A 2/1967 Louis et al.
(Continued)

FOREIGN PATENT DOCUMENTS

CA 2995604 9/2023
CN 2646670 10/2004
(Continued)

OTHER PUBLICATIONS

U.S. Appl. No. 18/769,565, filed Jul. 11, 2024, Makarewicz.
(Continued)

*Primary Examiner* — Sharon M Davis
(74) *Attorney, Agent, or Firm* — King & Spalding LLP

(57) ABSTRACT

A method and system for calibrating nuclear instrumentation of a reactor is disclosed. The system comprises a reactor configured to operate at a low power level and an external heater configured to heat the reactor to its operating temperature and maintain the reactor in a critical state. The reactor maintains its temperature at a steady state by repeating steps of reducing the heater's power and increasing the reactor's power by changing one or more reactivity settings, wherein the reduced heater's power is compensated by using the increased power generated by the reactor itself. The nuclear instrumentation is configured to measure the reac- (Continued)

tor's output power and compare it with the calculated reactor's power. Based on the discrepancy between the calculated power and the measured power exceeds a threshold; and the nuclear instrumentation is appropriately calibrated by adjusting one or more settings.

10 Claims, 7 Drawing Sheets

(56) References Cited

U.S. PATENT DOCUMENTS

| | | |
|---|---|---|
| 3,521,959 A | 7/1970 | Fassel et al. |
| 4,374,477 A | 2/1983 | Kikuchi et al. |
| 4,454,774 A | 6/1984 | Pridgen |
| 4,539,846 A | 9/1985 | Grossman |
| 4,774,050 A | 9/1988 | Impink |
| 4,779,453 A | 10/1988 | Hopenfeld |
| 4,783,997 A | 11/1988 | Lynnworth |
| 4,948,552 A | 8/1990 | Mollot et al. |
| 4,961,347 A | 10/1990 | Arakawa |
| 5,275,060 A | 1/1994 | Lynnworth |
| 5,280,728 A | 1/1994 | Sato et al. |
| 5,408,890 A | 4/1995 | Klaus |
| 5,440,930 A | 8/1995 | Daire et al. |
| 5,450,753 A | 9/1995 | Maynor |
| 5,824,915 A | 10/1998 | Hujzer et al. |
| 6,047,602 A | 4/2000 | Lynnworth |
| 6,125,912 A | 10/2000 | Branagan et al. |
| 6,143,431 A | 11/2000 | Webster |
| 6,258,185 B1 | 7/2001 | Branagan et al. |
| 6,318,192 B1 | 11/2001 | Carbone |
| 6,490,927 B2 | 12/2002 | Braunling et al. |
| 6,710,335 B2 | 3/2004 | Ellson et al. |
| 6,799,475 B2 | 10/2004 | Van Klooster |
| 6,983,654 B2 | 1/2006 | Balin |
| 7,093,502 B2 | 8/2006 | Kupnik et al. |
| 7,322,251 B2 | 1/2008 | Gysling et al. |
| 7,343,821 B2 | 3/2008 | Panicke et al. |
| 7,707,987 B2 | 5/2010 | Githrie |
| 8,238,509 B2 | 8/2012 | Moen et al. |
| 8,437,446 B2 | 5/2013 | Young |
| 8,642,954 B2 | 2/2014 | Ivaldi et al. |
| 8,746,440 B2 | 6/2014 | Williamson et al. |
| 8,767,905 B2 | 7/2014 | Neeley et al. |
| 8,844,347 B2 | 9/2014 | Electric |
| 8,893,558 B2 | 11/2014 | Davis et al. |
| 8,968,547 B2 | 3/2015 | Loewen et al. |
| 9,008,257 B2 | 4/2015 | Hyde et al. |
| 9,074,922 B2 | 7/2015 | Dayal et al. |
| 9,150,975 B2 | 10/2015 | Berger et al. |
| 9,224,507 B2 | 12/2015 | Heinold et al. |
| 9,234,777 B2 | 1/2016 | Ao et al. |
| 9,251,920 B2 | 2/2016 | Loewen et al. |
| 9,287,099 B2 | 3/2016 | Otsuka et al. |
| 9,295,923 B2 | 3/2016 | Mezheritsky et al. |
| 9,302,226 B2 | 4/2016 | Loewen et al. |
| 9,324,465 B2 | 4/2016 | Splichal, Jr. |
| 9,347,807 B2 | 5/2016 | Ao |
| 9,368,238 B2 | 6/2016 | Theofanous et al. |
| 9,368,241 B2 | 6/2016 | Loewen et al. |
| 9,460,818 B2 | 10/2016 | Bergman |
| 9,475,706 B2 | 10/2016 | Policke et al. |
| 9,557,200 B2 | 1/2017 | Forster |
| 9,638,607 B1 | 5/2017 | Hawthorne et al. |
| 9,664,543 B2 | 5/2017 | Twerdowski et al. |
| 9,691,507 B2 | 6/2017 | Hyde et al. |
| 9,691,508 B2 | 6/2017 | Hyde et al. |
| 9,720,171 B2 | 8/2017 | Arai |
| 9,748,006 B2 | 8/2017 | Hyde et al. |
| 9,761,336 B2 | 9/2017 | Caine et al. |
| 9,761,337 B2 | 9/2017 | Hyde et al. |
| 9,799,417 B2 | 10/2017 | Hyde et al. |
| 9,833,648 B2 | 12/2017 | Loewen et al. |
| 9,875,817 B2 | 1/2018 | Edwards et al. |
| 9,875,818 B2 | 1/2018 | Nygaard et al. |
| 9,921,158 B2 | 3/2018 | Rider |
| 9,921,184 B2 | 3/2018 | Corbin et al. |
| 9,968,899 B1 | 5/2018 | Gellaboina et al. |
| 9,995,609 B2 | 6/2018 | Fernald |
| 10,041,163 B1 | 8/2018 | Offer et al. |
| 10,056,160 B2 | 8/2018 | LeBlanc |
| 10,109,382 B2 | 10/2018 | Hackett et al. |
| 10,280,527 B2 | 5/2019 | Loewen et al. |
| 10,290,381 B2 | 5/2019 | Caine et al. |
| 10,309,813 B2 | 6/2019 | Gestner |
| 10,317,262 B2 | 6/2019 | Kippersund |
| 10,354,767 B2 | 7/2019 | Goreaud et al. |
| 10,416,045 B2 | 9/2019 | Launiere et al. |
| 10,438,705 B2 | 10/2019 | Cheatham, III |
| 10,497,480 B2 | 12/2019 | Cheatham, III et al. |
| 10,515,729 B2 | 12/2019 | Horn et al. |
| 10,566,096 B2 | 2/2020 | Czerwinski |
| 10,650,934 B2 | 5/2020 | Caine et al. |
| 10,665,356 B2 | 5/2020 | Abbott |
| 10,734,122 B2 | 8/2020 | Cisneros, Jr. |
| 10,741,293 B2 | 8/2020 | Abbott |
| 10,755,822 B2 | 8/2020 | Gibbons et al. |
| 10,825,571 B2 | 11/2020 | Edwards et al. |
| 10,830,689 B2 | 11/2020 | Hedtke |
| 10,876,871 B2 | 12/2020 | Head et al. |
| 10,937,557 B2 | 3/2021 | Sineath et al. |
| 10,962,461 B2 | 3/2021 | Linneen |
| 11,031,140 B2 | 6/2021 | Hunt et al. |
| 11,043,309 B2 | 6/2021 | Nygaard et al. |
| 11,049,624 B2 | 6/2021 | Loewen et al. |
| 11,075,013 B2 | 7/2021 | Abbott et al. |
| 11,075,015 B2 | 7/2021 | Cisneros, Jr. |
| 11,145,424 B2 | 10/2021 | Abbott |
| 11,149,623 B2 | 10/2021 | Kutsch et al. |
| 11,200,991 B2 | 12/2021 | LeBlanc |
| 11,226,281 B1 | 1/2022 | Findikoglu et al. |
| 11,286,172 B2 | 3/2022 | William et al. |
| 11,342,084 B2 | 5/2022 | Cheatham, III et al. |
| 11,342,085 B2 | 5/2022 | Hinds |
| 11,367,536 B2 | 6/2022 | Abbott |
| 11,373,765 B2 | 6/2022 | Czerwinski |
| 11,373,769 B2 | 6/2022 | Hinds |
| 11,380,450 B2 | 7/2022 | Sineath et al. |
| 11,417,435 B2 | 8/2022 | Nelson |
| 11,428,564 B2 | 8/2022 | Dayal et al. |
| 11,443,859 B2 | 9/2022 | Bass |
| 11,459,662 B2 | 10/2022 | Murahara |
| 11,482,345 B2 | 10/2022 | Hunt et al. |
| 11,488,731 B2 | 11/2022 | Abbott |
| 11,569,000 B2 | 1/2023 | Hinds |
| 11,574,094 B2 | 2/2023 | Pivovar et al. |
| 11,626,213 B2 | 4/2023 | Regan et al. |
| 11,875,906 B2 | 1/2024 | LeBlanc |
| 11,961,625 B2 | 4/2024 | Clarkson |
| 11,984,231 B2 | 5/2024 | Keller |
| 12,046,380 B2 | 7/2024 | Cheatham, III |
| 12,062,461 B2 | 8/2024 | Welter |
| 12,073,951 B2 | 8/2024 | Regan |
| 2002/0122522 A1 | 9/2002 | Goto et al. |
| 2004/0093957 A1 | 5/2004 | Buess et al. |
| 2006/0000711 A1 | 1/2006 | Lin |
| 2009/0046825 A1 | 2/2009 | Dulka et al. |
| 2011/0064181 A1* | 3/2011 | Moen ............... G21C 17/108 376/254 |
| 2012/0082911 A1 | 4/2012 | Hyde et al. |
| 2012/0082913 A1 | 4/2012 | Hyde et al. |
| 2012/0087455 A1 | 4/2012 | Hyde et al. |
| 2013/0199305 A1 | 8/2013 | Faermald |
| 2014/0123768 A1 | 5/2014 | Ao et al. |
| 2015/0040727 A1 | 2/2015 | Kosslow |
| 2015/0107371 A1 | 4/2015 | Khrakovsky |
| 2015/0310948 A1 | 10/2015 | Venneri |
| 2016/0334255 A1 | 11/2016 | Gestner |
| 2017/0271033 A1 | 9/2017 | Dodson et al. |
| 2017/0294241 A1 | 10/2017 | Dodson et al. |
| 2017/0294242 A1 | 10/2017 | Simpson et al. |
| 2017/0301416 A1* | 10/2017 | Hansen ............... G21C 1/16 |
| 2017/0358374 A1 | 12/2017 | Loewen et al. |

(56) References Cited

U.S. PATENT DOCUMENTS

| | | |
|---|---|---|
| 2018/0254109 A1 | 9/2018 | Cheatham, III et al. |
| 2018/0321192 A1 | 11/2018 | Gardner |
| 2019/0015806 A1 | 1/2019 | Gellaboina et al. |
| 2019/0057783 A1 | 2/2019 | LeBlanc |
| 2019/0139665 A1 | 5/2019 | Czerwinski et al. |
| 2019/0172597 A1 | 6/2019 | Carvajal et al. |
| 2019/0371482 A1 | 12/2019 | Benson |
| 2020/0118698 A1 | 4/2020 | Czerwinski et al. |
| 2020/0161015 A1 | 5/2020 | Czerwinski et al. |
| 2021/0095645 A1 | 4/2021 | Cheatham, III |
| 2021/0276888 A1 | 9/2021 | Kraczek et al. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0318673 A1 | 10/2021 | Kitchen et al. |
| 2021/0343431 A1 | 11/2021 | Cisneros, Jr. |
| 2022/0005619 A1 | 1/2022 | Cisneros, Jr. |
| 2022/0026288 A1 | 1/2022 | Liu et al. |
| 2022/0051818 A1 | 2/2022 | Cisneros, Jr. |
| 2022/0051820 A1 | 2/2022 | Corbin |
| 2022/0084702 A1 | 3/2022 | Loewen et al. |
| 2022/0310281 A1 | 9/2022 | Czerwinski |
| 2022/0390334 A1 | 12/2022 | Jorgensen |
| 2023/0104365 A1 | 4/2023 | Eichel et al. |
| 2023/0295796 A1 | 9/2023 | Kim |
| 2024/0035119 A1 | 2/2024 | Tilton |
| 2024/0062923 A1 | 2/2024 | Scherr |
| 2024/0087761 A1 | 3/2024 | Clarkson |
| 2024/0124985 A1 | 4/2024 | Tsang |
| 2024/0127978 A1* | 4/2024 | Lang ..................... G21D 3/002 |
| 2024/0167919 A1 | 5/2024 | Biegalski |
| 2024/0192123 A1 | 6/2024 | Robison |
| 2024/0246023 A1 | 7/2024 | Tsang |
| 2024/0266084 A1 | 8/2024 | Moore |
| 2024/0282473 A1 | 8/2024 | Cheatham, III |
| 2024/0312654 A1 | 9/2024 | Keller |
| 2024/0355488 A1 | 10/2024 | Callaway |
| 2024/0367921 A1 | 11/2024 | Tilton |
| 2024/0384934 A1 | 11/2024 | Lineen |
| 2024/0395426 A1 | 11/2024 | Welter |

FOREIGN PATENT DOCUMENTS

| | | |
|---|---|---|
| CN | 202471625 | 10/2012 |
| CN | 203080087 | 7/2013 |
| CN | 102553664 | 12/2013 |
| CN | 102967494 | 4/2015 |
| CN | 103714371 | 5/2016 |
| CN | 106596705 | 4/2017 |
| CN | 106643924 | 5/2017 |
| CN | 107230506 | 10/2017 |
| CN | 105334138 | 1/2018 |
| CN | 109141969 | 1/2019 |
| CN | 106621429 | 4/2019 |
| CN | 106840765 | 4/2019 |
| CN | 106769450 | 5/2019 |
| CN | 106902526 | 6/2019 |
| CN | 108231224 | 12/2019 |
| CN | 107238627 | 3/2020 |
| CN | 210803355 | 6/2020 |
| CN | 108956744 | 7/2020 |
| CN | 111739664 | 10/2020 |
| CN | 111739670 | 10/2020 |
| CN | 212484947 | 2/2021 |
| CN | 108956443 | 3/2021 |
| CN | 108088813 | 6/2021 |
| CN | 112946046 | 6/2021 |
| CN | 113372886 | 9/2021 |
| CN | 113630582 | 11/2021 |
| CN | 215770541 | 2/2022 |
| CN | 111141670 | 6/2022 |
| CN | 112853100 | 7/2022 |
| CN | 114813222 | 7/2022 |
| CN | 112700895 | 8/2022 |
| CN | 114974630 | 8/2022 |
| CN | 112992389 | 11/2022 |
| CN | 115420391 | 12/2022 |
| CN | 115436402 | 12/2022 |
| CN | 115237524 | 5/2023 |
| DE | 4124692 | 1/1993 |
| EP | 2624359 | 8/2013 |
| EP | 3335187 | 12/2023 |
| EP | 3335221 | 1/2024 |
| EP | 4100972 | 1/2024 |
| EP | 4326915 | 2/2024 |
| EP | 4288978 | 10/2024 |
| GB | 829958 | 3/1960 |
| JP | 2000-171386 | 6/2000 |
| JP | 2001033580 | 2/2001 |
| JP | 2010185785 | 8/2010 |
| NO | 321656 | 6/2006 |
| WO | WO 1992000507 | 1/1992 |
| WO | WO 2015017928 | 2/2015 |
| WO | WO 2015096901 | 7/2015 |
| WO | WO 2017032379 | 3/2017 |
| WO | WO 2017059360 | 4/2017 |
| WO | WO 2018009433 | 1/2018 |
| WO | WO 2017199059 | 2/2018 |
| WO | WO 2018026536 | 2/2018 |
| WO | WO 2018027170 | 2/2018 |
| WO | WO 2018064572 | 4/2018 |
| WO | WO 2018213669 | 11/2018 |

OTHER PUBLICATIONS

Harkema et al. Development and Demonstration of a Prototype Molten Salt Sampling System. Idaho National Laboratory [online]. Jan. 2023.

Hoffman, "Fudamentals of Ultrasonic-Flow Measurements for Industrial Applications," Krohne Messtechnik GmbH & Co. KG Duisburg, 2000, 31 pages.

A sampling device for molten-salt systems' (McDonald et al), Mar. 7, 1960 (Mar. 7, 1960). [online, retrieved from <URL:https://www.ostl.gov/servlets/purl/4187309>.

Gallaher, R. B. Operation of the Sampler-Enricher in the Molten Salt Reactor Experiment. No. ORNL-TM-3524. Oak Ridge National Lab. (ORNL), Oak Ridge, TN (United States), 1971.

Blain R. Lancaster, High Resolution Distributed Temperature Measurements Using Optical Fibers in a Molten Salt Forced Convection Environment, Texas A&M University, pp. 1-53 (Year: 2021).

Thurgood, "COBRA/TRAC—A Thermal-Hydraulics Code for Transient Analysis of Nuclear Reactor Vessels and Primary Coolant Systems," Mar. 1983.

RELAP5—3D, https://inl.gov/relap53d/.

System Analysis Module (SAM), https://www.anl.gov/nse/system-analysis-module.

Kile et al. "Assessment of SCALE and MELCOR for a generic pebble bed fluoride high-temperature reactor," Annals of Nuclear Energy vol. 173, Aug. 2022, 109107.

B. Chanaron, C. Ahnert, Nicolas Crouzet, Victor Sanchez, Nikola Kolev, et al.. Advanced Multiphysics Simulation for Reactor Safety in the framework of the NURESAFE Project. Annals of Nuclear Energy, 2015, 84, pp. 166-177. ff10.1016/j.anucene.2014.12.013ff. ffcea-02386823f.

Lee et al. "Multi-physics simulation of nuclear reactor core by coupled simulation using CUPID/MASTER," International Journal of Heat and Mass Transfer vol. 115, Part A, Dec. 2017, pp. 1020-1032.

\* cited by examiner

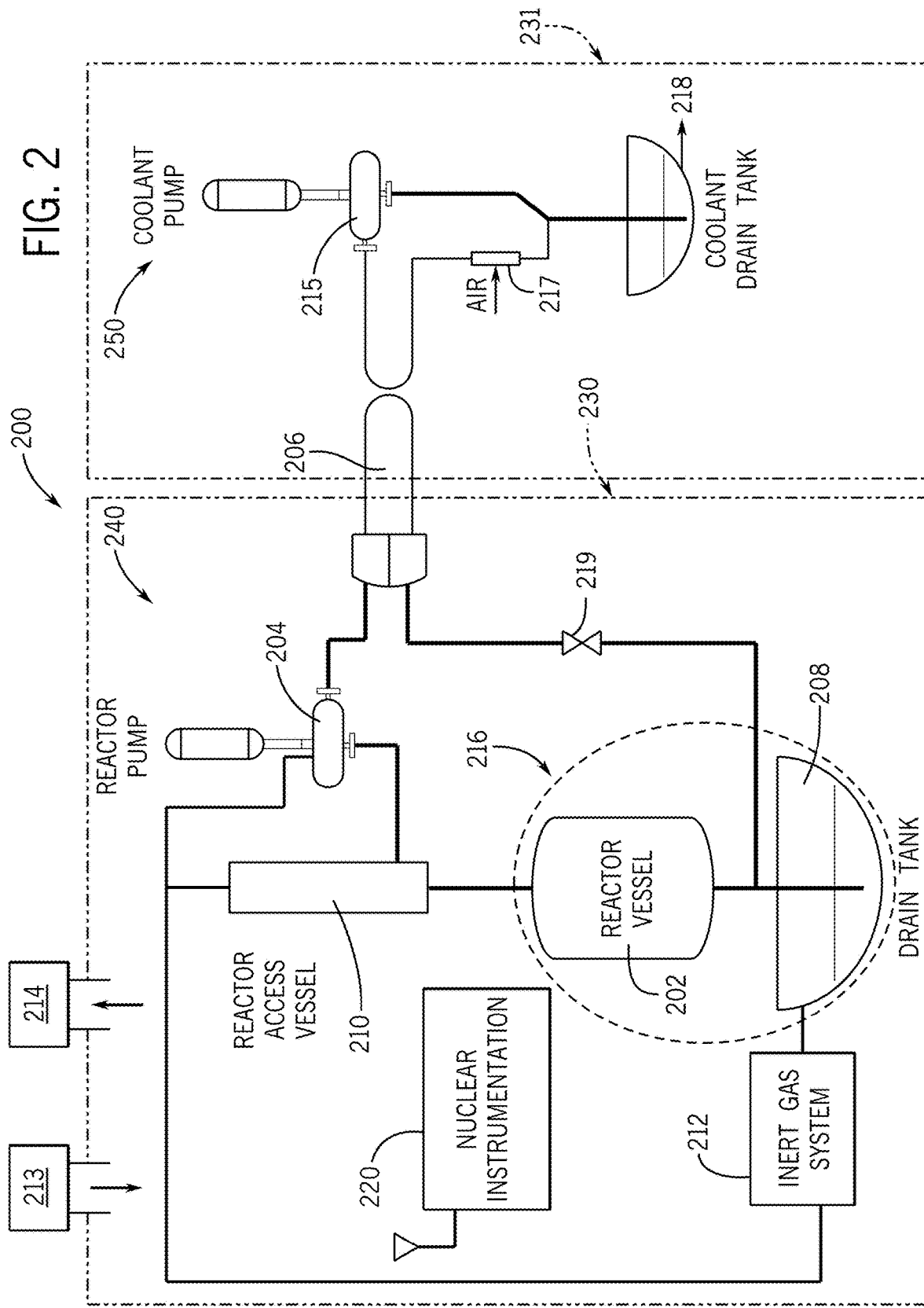

CALIBRATION OF POWER MONITORS IN MOLTEN SALT REACTORS

CROSS-REFERENCE TO RELATED APPLICATIONS

The present application claims priority under 35 U.S.C. § 119 to U.S. Provisional Application No. 63/518,021, filed on Aug. 7, 2023, which is hereby incorporated by reference in its entirety.

TECHNICAL FIELD

The described examples relate generally to systems, devices, and techniques for calibrating nuclear instrumentation for molten salt reactors, and in particular, for calibrating molten salt reactor power measurement systems in startup and low power level.

BACKGROUND

Molten salt reactors (MSRs) offer an approach to nuclear power that utilizes molten salt mixture as their nuclear fuel in place of the conventional solid fuels used in light water reactors. Advantages include efficient fuel utilization and enhanced safety (in part due to replacing water as a coolant with molten salt). In MSRs, fission reactions occur within a molten salt composition housed within a reactor vessel. The reactor vessel may carry hazardous substances, including substances that may be radioactive. It may therefore be desirable to continuously monitor and inform reactor states and parameters, such as thermal power, mass flow rate, and temperature at various points in the reactor system, to a system administrator for the safe and stable operation of the MSRs.

The power level of MSRs is a quantity that must be measured for both safety and operational concerns. A heat balance procedure can be applied to calibrate nuclear instrumentation (NI) of a reactor to measure gamma and neutron flux, ultimately outputting the reactor power. However, when the reactor is in low power operation before a full power operation regime is tested, accuracy of these measurements is limited, which will produce measurement results with significant uncertainties. Therefore, it is necessary to perform a low power calibration of the NI.

SUMMARY

In one example, a method for calibrating nuclear instrumentation of a reactor is disclosed. The method teaches that the reactor is operated at a low power level and a heater is used to warm the reactor to its operating temperature. One or more sensors are used to measure one or more parameters of the reactor. The reactor is configured to maintain its temperature at a steady state by repeating steps of reducing the heater's power by a predetermined amount in each step and increasing the reactor's power by changing one or more reactivity settings until the heater's power becomes zero, wherein in each step, the reducing the heater's power and the increasing the reactor's power are coordinated to compensate the reduced power from the heater by using the increased power generated by the reactor, and the reactor reaches thermal equilibrium.

The method further teaches calculating the reactor's power based on the measured parameters. The nuclear instrumentation is used to measure the reactor's power and compare it with the calculated reactor's power. If the difference between the calculated reactor's power and the measured reactor's power exceeds a threshold, the nuclear instrumentation is calibrated appropriately by adjusting one or more settings.

In another example, the reactor is a molten salt reactor.

In another example, the heater is an external energy source.

In another example, the heater reduces its power output at the same time as the reactor increases its power output.

In another example, the reactivity settings comprise control rod positions, pump power, and flow rate.

In another example, the nuclear instrumentation comprises two uncompensated ion chambers, two compensated ion chambers, and two fission chambers.

In another example, the nuclear instrumentation is configured to measure neutron flux or neutron count rate and to measure the reactor's power based on the measurement of neutron flux or neutron count rate.

In another example, the reactor's power is calculated based on energy input from a fuel salt pump, energy input from a coolant salt pump, energy input from the heater, sum of energy released by the one or more sensors, thermal energy carried in by gas and fluid, thermal energy carried out by gas and fluid, and thermal energy carried out through concrete cases of the reactor.

In another example, the one or more parameters measured by the one or more sensors include temperature information, energy input from a fuel salt pump, energy input from a coolant salt pump, energy input from the heater, sum of energy released by the one or more sensors, thermal energy carried in by gas and fluid, thermal energy carried out by gas and fluid, and thermal energy carried out through concrete cases of the reactor.

In another example, a system for calibrating nuclear instrumentation of a reactor is disclosed. The system comprises a reactor configured to operate at a low power level, a nuclear instrumentation configured to measure the reactor's power, a heater configured to warm the reactor to the reactor's operating temperature, and one or more sensors, mounted through the reactor, configured to measure one or more parameters of the reactor. The reactor maintains its temperature at a steady state by repeating steps of reducing the heater's power by a predetermined amount in each step and increasing the reactor's power by changing one or more reactivity settings until the heater's power becomes zero, wherein in each step, the reducing the heater's power and the increasing the reactor's power are coordinated to compensate the reduced power from the heater by using the increased power generated by the reactor, and the reactor reaches thermal equilibrium.

In another example, the system is configured to reduce the heater's power and increase the reactor's power at the same time.

In addition to the example aspects described above, further aspects and examples will become apparent by reference to the drawings and by study of the following description.

BRIEF DESCRIPTION OF THE DRAWINGS

FIG. 2 depicts a schematic block diagram of an example reactor system with a reactor thermal management system.

Figure 1A:
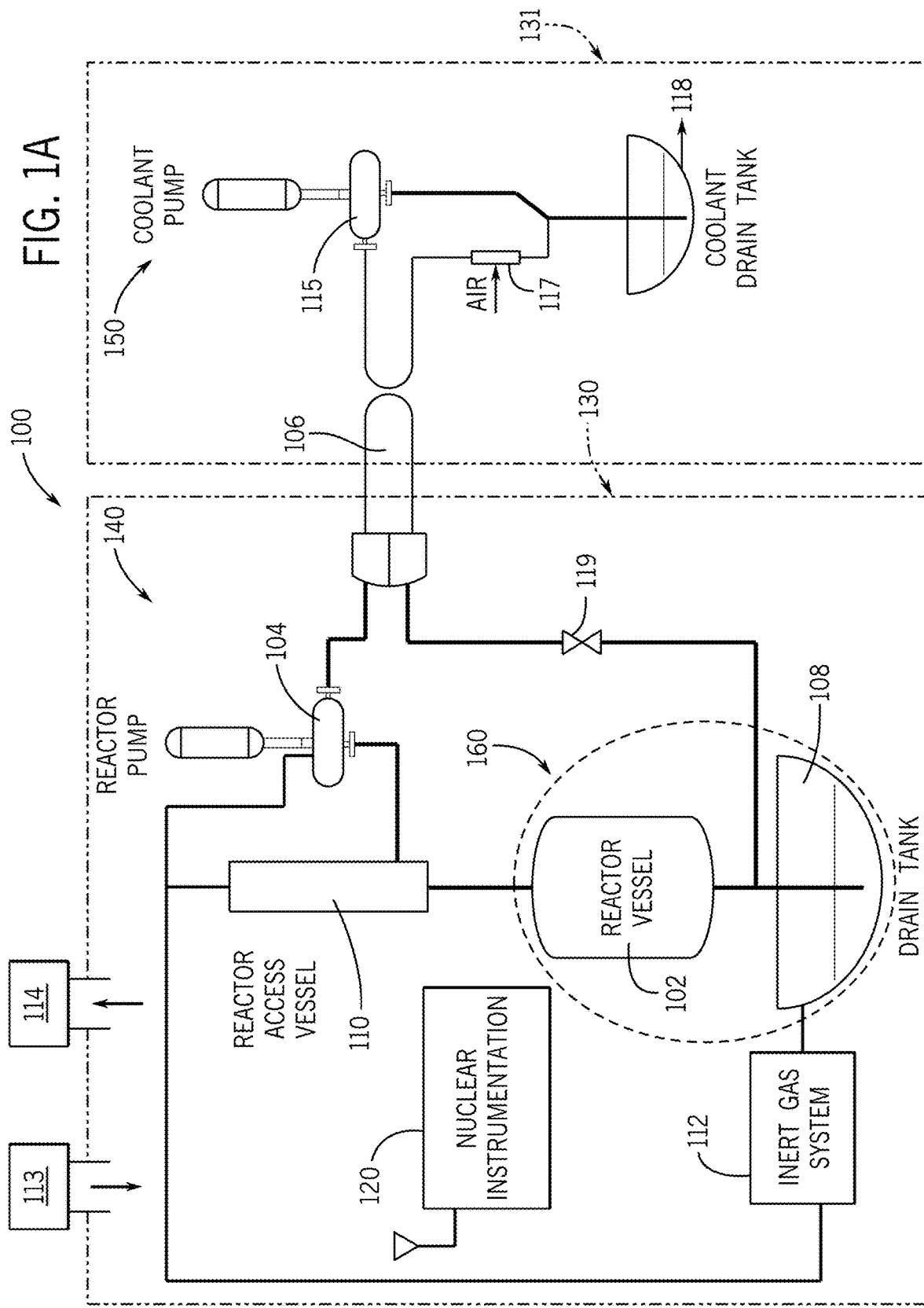
FIG. 1A depicts a schematic block diagram of an example reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to apparatuses, systems and methods that calibrate Nuclear Instrumentation (NI) of a molten salt reactor (MSR). The NI refers to sensors, detectors, and measurement devices used in nuclear reactors and other nuclear facilities to monitor, control, and ensure the safe and efficient operation of the reactor system. These instruments may be used for measuring and monitoring various physical parameters and conditions within the reactors.

In the present disclosure, the NI, including fission chambers, compensated ion chambers, uncompensated ion chambers and/or other instrumentation, may be used to measure the power of the reactor through gamma and neutron flux measurements, providing power as an output based on calibrations relating the measurements to the geometry of the core, flux distribution, and the relationship between flux levels and power levels. Based upon the instrumentation's internal calculations, and the known nature of the geometry, the primary value needed to adjust these outputs to reflect the real reactor is the empirical measurement of the thermal power of the system, which can be input into the NI through electronic controls to properly calibrate the system.

One method of determining the thermal power for calibrating the reactor is to determine the heat balance of the reactor. This following disclosure describes a heat balance procedure on the MSR. Analysis of the heat balance equation indicates that the primary quantities of interest will be mass flow rates and temperatures, and that it is possible to perform calculations based upon air or salt heat balances.

The MSR may be a 1 MWth research reactor. The MSR fuel may use a lithium fluoride (LiF) and beryllium fluoride (BeF) salt, commonly known as lithium-beryllium fluoride (FLiBe) with a small portion of enriched UF4, and the coolant loop carrying thermal energy from the heat exchanger to the radiator will also use FLiBe. Due to the higher corrosion risks and temperature conditions designed to best utilize these materials, relevant sensors with a high Technology Readiness Level (TRL) for nuclear applications are unavailable for the coolant loops. The lower TRL of relevant sensors for measuring certain FLiBe characteristics directly, in turn, means such sensors must be considered experimental, due to the present inability to sufficiently prove their reliability prior to initial operation of the MSR. Thus the method of determining the thermal power of the reactor may involve measurement of the heat rejected to air by the primary heat removal system (PHRS) radiator and the auxiliary heat removal system (AHRS).

Turning to the drawings, for purposes of illustration, FIG. 1A illustrates an example MSR 100. The MSR 100 may implement and include nuclear instrumentation 160, and implement any of the functionalities of each described herein. As will be understood, the example shown in FIG. 1A represents merely one example configuration of a MSR 100 in which such nuclear instrumentation may be utilized. It will be understood that the nuclear instrumentation described herein may be used in and with substantially any other configuration of the molten salt reactor, as contemplated herein.

In various embodiments, a MSR 100 may utilize fuel salt enriched with uranium (e.g., high-assay low-enriched uranium) to create thermal power via nuclear fission reactions. In at least one embodiment, the composition of the fuel salt may be LiF—BeF2-UF4, though other compositions of fuel salts may be utilized as fuel salts within the reactor system 100. The fuel salt within the system 100 is heated to high temperatures (about 600° C. or higher) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106 in a primary loop, such that the molten fuel salt re-enters the reactor vessel after flowing through the heat exchanger, and piping in between each component. The heat exchanger 106 is coupled to a secondary loop that is connected to a coolant salt pump 115, an air-cooled radiator 117, and a coolant drain tank 118. The coolant pump 115 circulates the coolant salt through the heat exchanger, where it absorbs heat generated by the reactor core from the primary loop and then transfers it to a power generation system. In some examples, the heat generated in the core was transferred to the secondary loop through the heat exchanger and ultimately rejected to the atmosphere through the radiator 117.

Still referring to FIG. 1A, the MSR 100 may also include additional components, such as, but not limited to, a drain tank 108 and a reactor access vessel 110. The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride (UF4) to the system 100 as necessary to bring the reactor to a critical state and compensate for depletion of fissile material.

In several examples, the MSR 100 may include an inert gas system 112 to provide inert gas to a head space of the drain tank 108, among other functions. The inert gas system 112 may further relieve inert gas from the head space of the drain tank 108 as needed. The inert gas system 112 is therefore operable to maintain pressurized inert gas in the head space of the drain tank 108 that is sufficient to substantially prevent the flow of molten fuel salt into the drain tank during normal operations. For example, with the head space of the drain tank 108 pressurized by the inert gas system 112, molten salt may generally circulate between the reactor vessel 102 and the heat exchanger 106 without substantially draining into the drain tank 108. As described herein, the inert gas system 112 may be configured to supply inert gas to the head space of various other components of the MSR 100, such as to the head space of the reactor access vessel 110, to the seal of reactor pump 104, among other components. Upon the occurrence of a shutdown event, the inert gas system 112 may cease providing inert gas to the head space of the drain tank 108, and other components to which the system 112 supplies inert gas.

Furthermore, the primary loop, including the pumps, tanks, and vessels, can be contained within a reactor enclosure 130 that defines a containment volume 140, where reactor enclosure is made of concrete. Similarly, the secondary loop, including the pumps, tanks, and vessels, can be contained within another reactor enclosure 131 that defines a containment volume 150, where enclosure is also made of concrete. The primary loop and the secondary loop may cooperate to form a primary heat removal system (PHRS). The PHRS, as described herein, may operate to remove heat from the MSR 100. For example, the fuel salt of the primary loop may generally increase in temperature as a result of fission reactions that occur with the reactor vessel 102. The heat from the molten salt may be transferred away from the primary loop by operation of the secondary loop and coolant salt circulated therein. For example, the coolant salt of secondary loop may remove heat from the primary loop via the heat exchanger 106. The secondary loop may be at least partially housed in a containment volume 150, and, may include a power generation system (not shown in the FIG. 1A). To maintain optimal operating temperatures and ensure the reactor's safe and stable performance, the air-cooled radiator 117 may be included in the secondary loop to utilize ambient air to dissipate heat from the coolant salt, transferring the absorbed thermal energy to the atmosphere. Nuclear instrumentation (NI) 120, such as neutron detector, fission chambers, compensated ion chambers, and uncompensated ion chambers and/or other instrumentation, may be located within the containment volume 140 to measure the power of the reactor 100 through gamma and neutron flux measurements, providing power as an output to a remotely located instrumentation and control (I&C) system. In some examples, the NI 120 may include neutron detectors that are configured to measure the neutron count rate in the reactor 100 for power measurement. The I&C system may usually include a MSR human machine interface (HMI) console that can control all reactor operations and provides various indicators and parameters of the reactor. The I&C system may also include reactor protection system and engineered safety features actuation system (RPS/EFAS), reactivity control system (RCS), area radiation monitoring system (ARMS), and the HMI console and supporting systems. In the present disclosure, the NI 120 may communicate the gamma and neutron flux measurements as data signals to the I&C system via one or more communication links.

In addition, one or more sensors may be mounted throughout different locations within the reactor enclosure 130 to perform various measurements of the reactor 100. For example, thermocouples are commonly used to measure the temperature, including the air temperature, salt temperature, and concrete temperature. As an example, sensors 113 and 114 mounted on the reactor enclosure 130 may include the thermocouples configured to measure the inlet and outlet air temperatures, as well as the concrete temperature. As another example, mass flow rates, such as the molten salt flow rate, can be measured in molten-salt systems with orifice or venturi elements. For example, sensor 119 can be a venturi flowmeter that is used in the reactor 100 to measure the molten salt flow rate. Some alternative options include thermal anemometers, incorporating with the thermocouple, activation based flow sensor, ultrasonic flow sensor, and magnetic flow sensor. With multiple pressure sensors at appropriate locations, it would be possible to determine the mass flow rate of the salt on the primary or secondary loops. It should be noted that the sensor 119 can be placed in other locations or incorporated into other components within the reactor 100 to provide different measurements.

Figure 1B:
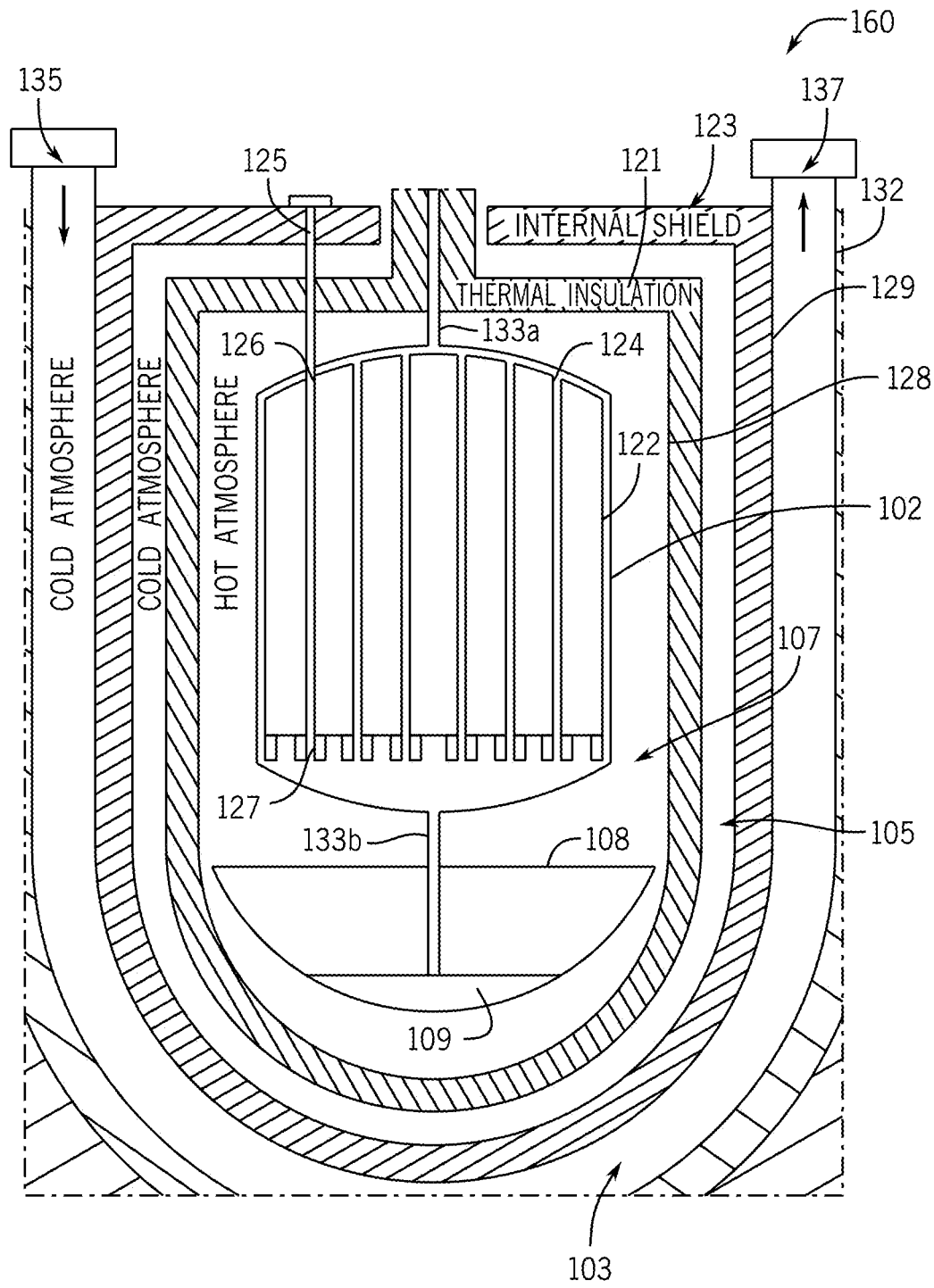
FIG. 1B depicts a schematic block diagram of a primary heat removal system within an example reactor system.

A cross-sectional view of certain components of the MSR 100 is shown in FIG. 1B. For example, FIG. 1B shows a structure 160 including a first thermally insulative region 107 may be designated as a "hot atmosphere" in that a temperature in this region is sufficiently high to liquify the salt and maintain all molten salt included therein in a molten state. A second thermally insulative region 105 may be designated as a "cold atmosphere" in that it has a temperature that is generally lower than the first thermally insulative region 107. Further, a third thermally insulative region 103 may also be designated as a "cold atmosphere" in that it has a temperature that is generally lower than each of the first thermally insulative region 107 and the second thermally insulative region 105. In some cases, a reactor thermal management system (RTMS), which will be discussed below in detail and illustrated in FIGS. 2 and 3, may operate to maintain and/or control a temperature of the third thermally insulative region 103 to at or below a temperature that is suitable for the operation and/or integrity of certain components of the system, such as by maintaining a temperature of the third thermally insulative region 103 at or below a temperature that would otherwise cause mechanical weakness of the concrete or structural steel included therein.

In the present disclosure, FIG. 1B also shows certain elements of one example auxiliary heat removal system or "AHRS." Broadly, the AHRS may include components and system for removing heat from the reactor and reactor enclosure other than by use of the coolant salt, as described above. For example, as shown in FIG. 1B, one implementation of the AHRS may include an intake of cool air from port 135, and removal the heat from the reactor through port 137. In some cases, the passage of air between the ports 135, 147 may be passive, in other cases, active circulation techniques may be deployed. In operation, one or more sensors may be placed at port 135 and port 137 to measure inlet and outlet air flow rates and temperatures and use the measurements for heat balance procedure, as described in greater detail below with reference to FIGS. 4 and 5. As shown in FIG. 1B, to facilitate the foregoing, the RTMS may include an internal shield 123 associated with or included within the reactor enclosure 129.

For purposes of illustration, FIG. 1B further shows graphite moderator 122 within the reactor vessel 102 that define flow channels 126 for a molten salt 109. The reactor vessel 102 is also shown with the moderator 122 defining a control rod channel 127 for receipt of a control rod therein. In operation, molten salt 109 may circulate through the reactor vessel 102 and associated molten salt loop as described herein. FIG. 1B shows a quantity of the molten salt 109 included within the drain tank 108. The RTMS may operate to optionally maintain the molten salt 109 in a molten form for a period of time, despite the molten salt 109 being subcritical and being held in the drain tank 108. For example, the RTMS may define the various thermally insulative barriers described herein so as to maintain the molten salt 109 in a molten state for a period time. This may allow the system to recirculate the molten salt and/or otherwise move the molten salt for repair, replacement, or operation of the reactor with greater efficiency and safety.

As described herein, the RTMS of the present disclosure may be configured to surround and thermally insulate at least the molten salt reactor vessel and another component (e.g., a "second component," such as a drain tank) that is fluidically coupled with the molten salt reactor vessel. For example, and as described above, the RTMS is shown including an internal vessel or internal shield that surrounds the molten salt reactor vessel and the drain tank (e.g., the second component). In other examples, the RTMS of the present disclosure may be configured to surround additional components of the molten salt loop including, without limitation some or all of a reactor access vessel, a reactor pump, a heat exchanger, and associated piping of the molten salt loop that fluidly couples said components to one another to form a continuous fluid circuit.

FIG. 2 illustrates another example MSR 200. The MSR 200 may be substantially analogous to the MSR 100 described above in relation to FIG. 1A. In this regard, the MSR 200 is shown in FIG. 2 as including a reactor vessel 202, a fuel salt pump 204, a heat exchanger 206, a drain tank 208, a reactor access vessel (RAV) 210, an inert gas system 212, a coolant salt pump 215, an air-cooled radiator 217, a coolant drain tank 218, sensor 219, nuclear instrumentation (NI) 220, reactor enclosures 230 and 231; redundant explanation of which are omitted for clarity.

Notwithstanding the foregoing similarities, the MSR 200 of FIG. 2 is shown as including a reactor thermal management system (RTMS) 216. The RTMS 216 can be implemented as an integral thermal insulation enclosure ("furnace") encompassing the reactor vessel 202, drain tank 208, and associated piping as depicted in the functional schematic in FIG. 2, as shown in greater detail in the example of FIG. 3.

Figure 3:
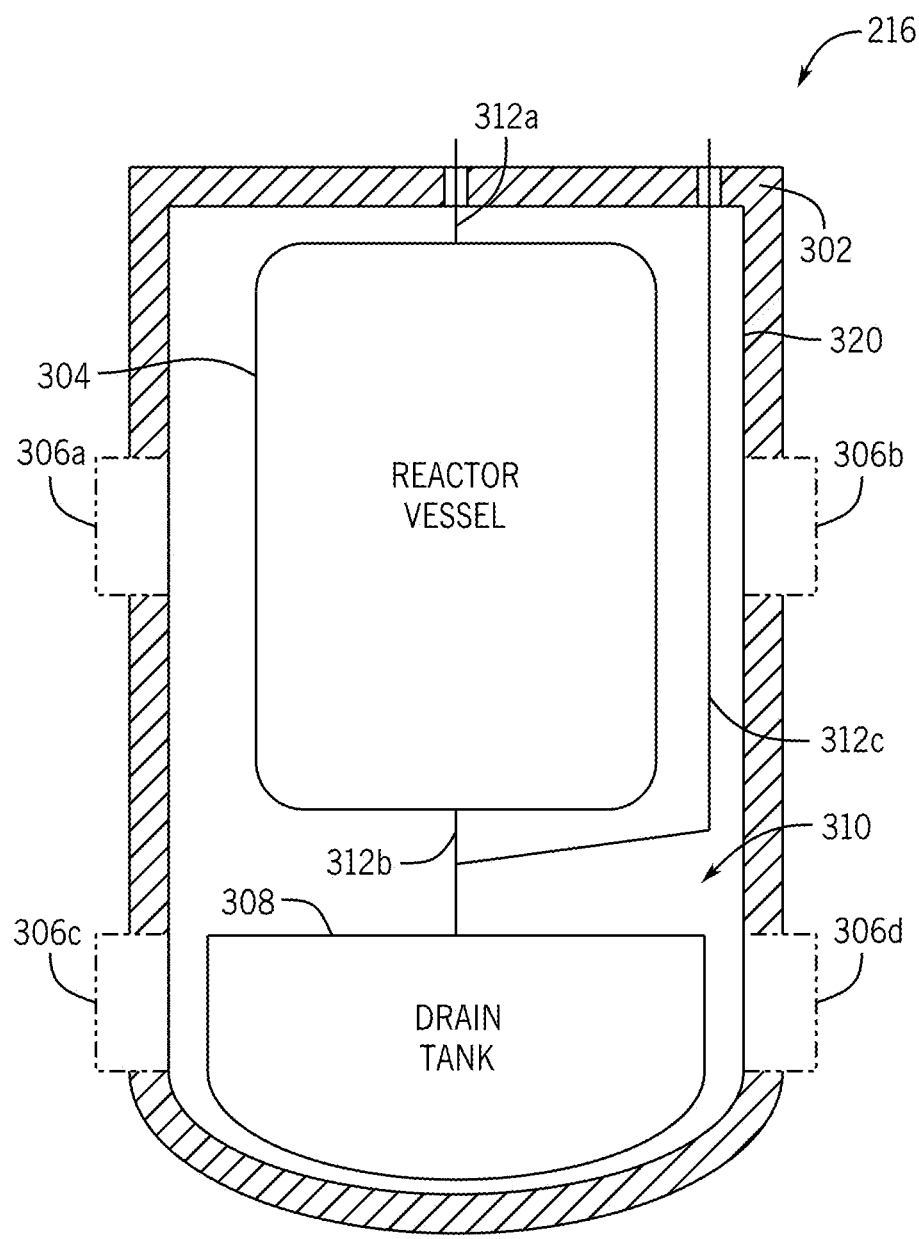
FIG. 3 depicts a schematic block diagram of an example reactor thermal management system in an example reactor system.

The RTMS 216 disclosed herein may be used to maintain and/or control a temperature of one or more components of the MSR 200 of FIG. 2. The RTMS 216 may also include a AHRS as illustrated in FIG. 1B (omitted here for ease of presentation). The RTMS 216 is shown in FIG. 3 as including an insulative layer 302, a reactor vessel 304, heaters 306*a-d*, a drain tank 308, piping 312*a-c*, an internal shield or vessel 320. In operation, the RTMS 216 is configured to maintain and/or control a temperature of the reactor vessel 304 and the drain tank 308. The reactor vessel 304 and the drain tank 308 may be substantially analogous to the reactor vessel 102/202 and the drain tank 108/208 described above in relation to FIGS. 1A and 2; redundant explanation of which is omitted herein for clarity. For example, the reactor vessel 304 and the drain tank 308 may be tanks or vessels along a molten salt loop in which a heated molten salt is emitted from the reactor vessel at piping 312*a*, and recircuited to the reactor vessel 304 in cooled form via piping 312*b* and 312*c*.

The internal vessel 320 may be a thermally insulative metal (including certain stainless steels) that is capable of withstanding substantially high temperatures, such as temperature more than 600° C. The internal vessel 320 may surround the reactor vessel 304 and the drain tank 308 in order to define a first thermally insulative region 310 thereabout. The first thermally insulative region 310 may be a region of the reactor system that is generally maintained at a temperature that is sufficient to retain the molten salt of the molten salt loop in a molten state. Accordingly, a temperature of the first thermally insulative region 310 may, in certain cases, exceed 600° C. As described in greater detail herein, the internal vessel 320 may also serve as an additional containment barrier and catch-pan within which molten salt may be retained in the event of a leak event from any of the salt-bearing components that are held within the first thermally insulative region 310.

The insulative layer 302 may be associated with and connected to the internal vessel 320 in order to facilitate the retention of heat within the first thermally insulative region 310. The insulative layer 302 may further be configured to establish a barrier between the first thermally insulative region 310 and components outside of the RTMS 216 (such as the concrete trench, structural steel, and so on), which may generally require lower temperatures to safely operate and perform the intended function of the component. In the example of FIG. 3, the insulative layer 302 may be formed from a polytetrafluoroethylene material. In other examples, other appropriate insulative materials could be used.

The heaters 306*a-d* may be resistance heaters that are thermally coupled with the internal vessel 320 or that are otherwise configured to impart thermal energy to the first thermally insulative region 310. In this regard, in operation, the heaters 306*a-d* may be used to control a temperature of the first thermally insulative region 310. For example, the heaters 306*a-d* may be used to heat the first thermally insulative region 310 where the temperature of the first thermally insulative region 310 drops below a threshold temperature. The heaters 306*a-d* may therefore operate to retain the first thermally insulative region 310 at a temperature that allows the molten salt to remain in a molten state. This may be advantageous, for example, where the internal vessel 320 is used to catch molten salt from a leak event, and the heaters 306*a-d* operate to impart thermal energy to the first thermally insulative region 310 sufficient to maintain the leaked molten salt in a molten state within the catch pan or bottom of the internal vessel 320. In addition, by imparting thermal energy to the first thermally insulative region 310, the heaters 306*a-d* may further operate to retain the reactor vessel 304 at a temperature that allows the molten salt to remain in a molten state, enabling fission reactions to be occurred in the reactor vessel 304 even the reactor itself is at initial start-up and low power stage.

Figure 4:
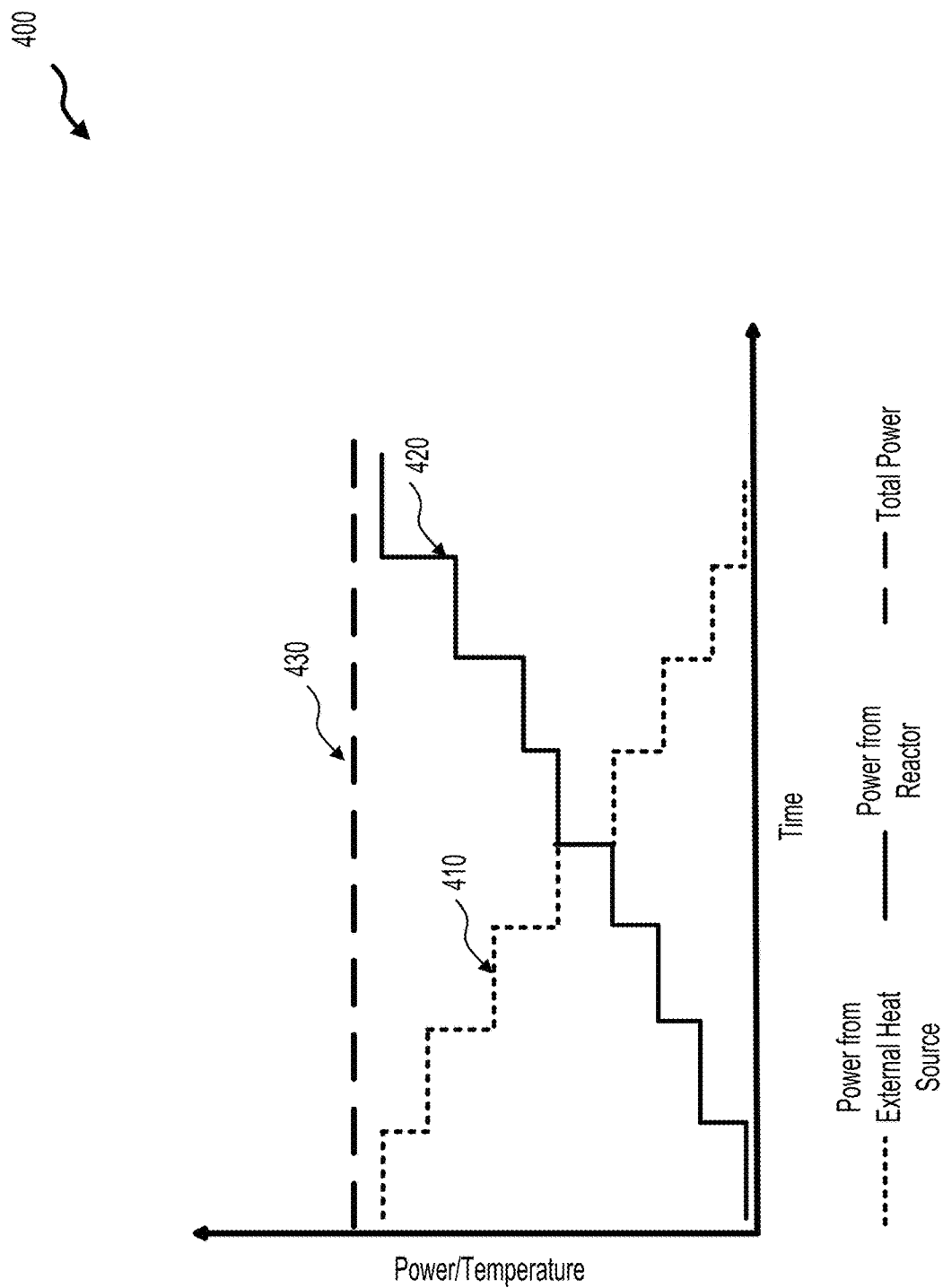
FIG. 4 depicts an example power calibration process of an example reactor thermal management system in an example reactor system.

In operation, the heaters 306*a-d* works as external energy sources that heat the reactor vessel 304 to liquify the fuel salt in the initial start-up and low level stage. As the reactor vessel 304 starts to provide more energy and approach a critical state, the RTMS 216 will slowly reduce the output power of the heaters 306*a-d* and ultimately deactivate them as the sources of heat. In this process, the NI and sensors are used to measure the reactor power and compare it with the calculated value based on heat balance procedure. Based on the comparison results, the NI is calibrated appropriately. In the meantime, the reactor 200 of FIG. 2 is configured to change its reactivity settings so that the reduced power from the heaters 306*a-d* is compensated by the increased power from the reactor 200 itself. For example, the reactor 200 may control rod positions, pump power, flow rate, and the others to chant its own power output. As illustrated in FIG. 4, the combination of the power (430) generated from the reactor itself (420) and the power from the external heat source (410) should stay the same.

Methodology for Power Measurement

The primary value of interest in terms of power generation for the NI is the overall power of the MSR core. The local power produced by a nuclear reactor varies in space and has a three dimensional distribution, but can be integrated over the reactor core to determine the total power involved. The energy produced from nuclear reactions is released as kinetic energy of fission products and particles produced by the reaction. This energy produced is proportional to the reactors flux measurements. The neutron and gamma flux are quantities that can be measured by various detectors. The MSR geometry and materials can be considered known quantities, so a detector at a known location can be used to compare to the normalized flux distribution expected from theoretical models for a given core configuration to determine the peak flux. With the flux distribution determined from the theoretical models and the measured value, it is possible to integrate over the expected distribution and determine to total flux produced based on the detector flux measurement, and this value can then be used to determine the power based on the energy per reaction.

Modern detectors used in reactor cores are designed to perform the adjustments from the measured flux value to the total power internally and output the power indicated to operators directly, based on their calibration. These internal calculations are what will be adjusted based on empirical measurements of the power through the heat balance to ensure calibration is performed properly to reflect the actual thermal power produced by the reactor, rather than theoretical relationships from design calculations.

Nuclear Instrumentation for Power Measurement

A heat balance procedure is applied to calibrate the NI, the instrumentation used to measure the gamma and neutron flux, and ultimately to output the reactor power. These sensors of the NI are chosen for reliability and the ability to self-calibrate and fault detect in conjunction with a primary distributed control system (DCS). Accuracy is also important, since the uncertainty must be account for when selecting control set points. All of these sensors will be located outside of a Reactor Thermal Management Systems (RTMS), but within the reactor enclosure.

The NI, including fission chambers, compensated ion chambers, uncompensated ion chambers and/or other instrumentation, may be used to measure the power of the reactor through gamma and neutron flux measurements. In the present disclosure, the NI may include three sets of different sensors that are used to measure the neutron flux or power. These sensors come in sets of two to provide redundancy that will help ensure that minimal maintenance will be required over the course of the MSR's lifetime operation. Separate instrumentation paths and independent equipment are utilized to prevent single failures from disabling multiple detectors.

The first set of instrumentation, and the only set that is safety related, may include two uncompensated ion chambers, which serve as the nuclear safety channels. The ion chambers collect all charges created by incident radiation and a gas contained in the ion chamber to produce a direct current, which can accurately measure overall ionizing effect but not the energy levels of individual ionizing events. They are preferred for high radiation dose rates due to the lack of dead time in Geiger-Mueller tubes, which affects accuracy. The nuclear safety channels are primarily focused on ensuring the design conditions of the reactor fuel salt boundary are not exceeded and that postulated accident scenarios do not result in damage to the fuel salt boundary or disturb the core, the associated support structure, or reactor internals during these scenarios by triggering automated reactor trips. This information can also collaborate power measurements for full power scenarios.

The second set of instrumentation may include two compensated ion chambers, which will serve as multi-range linear power channels. Compensating in the ion chamber using a reference chamber allows the sensor to electronically cancel out gamma effects, which can make a significant contribution to the measurement at intermediate power ranges. The linear power channels are used primarily for determining power at full-power operation.

The third set of instrumentation may include two fission chambers, which will serve as either multi-range or full-range log power channels. Fission chambers are a form of ion chamber lined with highly enriched U-235. Neutrons are not directly ionizing, but interaction with the fissile material can convert them to charged particles that can be detected. Fission fragments from neutrons interacting with the coating cause significantly larger amounts of ionization than incident gamma particles. This process makes the fission chamber very sensitive to neutrons, allowing it to operate in relatively higher gamma fields compared to ordinary ion chambers. The detector (i.e., fission chamber) can be used in pulse mode where high sensitivity allows it to detect individual detector reactions, current mode where it operates similarly to an ordinary ion chamber, and Campbell mode in higher fluence environments where pulses pile up and cannot be accurately measured individually because one pulse does not disappear before another is registered, but the signal fluctuation can be measured and functions are a neutron proportional signal, since the difference between the gamma detections and neutron detections are as large as possible in this regime. The overall effect is that the detector can handle a wide range of power using different modes. These sensors are primarily used for start-up and low power operation.

Combined, the NI will provide power information over the full power range of the system, including subcritical multiplication and credible accident scenarios. While calibration using the heat balance is intended to be done at steady state conditions, the NI will show the power as a function of time during operation.

Calibration for Power Measurement

The NI sensors are designed to measure flux, but their primary output is reactor power. They convert a localized measurement of flux at a known location to an overall power measurement based upon the initial calibration from theoretical models approximating expected flux distributions in a given operational regime. Adjusting the calibration using empirical data will primarily involve inputting the corrected reactor power, as measured from its thermal effects using the heat balance procedure outline below, into the instrument to update the internal calculations through the systems controls, which will then output the corrected power to the operator at the appropriate output display.

Methodology for Determining Heat Balance

The heat balance can be calculated through the following procedure by creating a closed system around the air in the systems pit:

$$W_{in} - W_{out} = 0 \qquad (1)$$

wherein $W_{in}$ is the energy input into a reactor system per second, and $W_{out}$ is the energy output per second. $W_{in}$ can be broken down to $$W_{in} = W_{FP} + W_{CP} + W_{RMTS} + W_{misc} + \dot{Q}_{air,in} + \dot{Q}_{core} \qquad (2)$$

wherein $W_{FP}$, $W_{CP}$, and $W_{RMTS}$ are the energy input per second of a fuel salt pump, energy input per second of a coolant salt pump, and energy input per second of the RTMS, respectively, which may be reduced to zero if a given system is inactive. They can be determined from the power consumed or direct measurement. As discussed above and illustrated in FIG. 3, the RTMS is implemented as an integral thermal insulation enclosure ("furnace") and its energy input is mainly provided by heaters 306a-d. The power levels of the furnace (i.e., heaters 306a-d) can be recorded and measured by the I&C system. $W_{misc}$ is the sum of the energy released by various minor systems, including but not limited to the NI and other sensors that are operating within the system pit, which can be determined from the power consumed and should generally be negligible. $\dot{Q}_{air,in}$ is the thermal power carried in by the air, particularly through the PHRS and AHRS, and $\dot{Q}_{core}$ is the thermal power produced by the nuclear reactor, the value to be determined. Because the heat balance should be calculated at a steady state, the gas management system is in maintenance mode, circulating helium primarily to prevent stagnation in the gas instrument lines, and is not expected to significantly contribute to the system. If necessary, the contribution of this system can be determined using existing sensors for monitoring the gas management system, and calculated through a similar process to determining the impact of the air below. Similarly, because the systems pit is expected to be at or above ambient temperature, it can be assumed no heat is input through the concrete. Any additional fluid or gas interfaces into the enclosure can be addressed in a similar manner.

Similarly, $W_{out}$ can be broken down to $$W_{out} = \dot{Q}_{air,out} + \dot{Q}_{bound} \qquad (3)$$

wherein $\dot{Q}_{air,out}$ is the thermal power carried out by the air, particularly through the PHRS and AHRS, and $\dot{Q}_{bound}$ is the thermal energy that exits the system through the enclosure per second. The enclosure heat transfer rate can be estimate using the integral form of Fourier's law to produce the conductive heat transfer equation with the concrete treated as a 1D homogenous material, which is given by $$\dot{Q}_{conc} = \sum_{i=1}^{Y} U_i A_i \Delta T_{bound,i} \qquad (4)$$

Herein, Y is the total number of enclosure surfaces in the systems pit, $U_i$ is the conductive coefficient of heat transfer for a given surface i, $A_i$ is the area of surface i, and $\Delta T_{bound,i}$ is the temperature difference across the enclosure material, typically concrete at surface i. The temperature difference can be calculated by using $$\Delta T_{bound,i} = T_{SP,i} - T_{AT,i} \qquad (5)$$

wherein $\Delta T_{bound,i}$ is the difference between the systems pit temperature measured closest to the surface i $T_{SP,i}$ and ambient temperature $T_{AT,i}$ for the environment on the other side of enclosure surface i. The system's pit temperature can either be measured directly, or assumed to be equal to the measured outgoing temperature of the AHRS. The ambient temperature is determined from measurements or fixed by assumptions of environmental conditions, such as the local dirt temperature. The overall coefficient of heat transfer, on the other hand, can be determined from the equation $$U_i = \frac{k_i}{s_i} \qquad (6)$$

wherein $k_i$ is the thermal conductivity of the material at surface i, which has minor temperature dependence but can be approximated based on the ambient temperature, and $s_i$ is the thickness of the material at surface i. Both the material composition of the enclosure boundary and the thickness are known from the design, so the overall coefficient of heat transfer for each surface is a known quantity based on the thickness of the material to reach the ambient temperature.

In addition, the details of the heat carried in and out by the air can be calculated by using equation $$\dot{Q}_{air} = \dot{Q}_{air,in} - \dot{Q}_{air,out} = \sum_{i=1}^{X} \dot{m}_i c_i T_i \qquad (7)$$

wherein X is the total number of ingress and egress points for air in the system, primarily defined by the penetrations as part of the PHRS and AHRS, $\dot{m}_i$ is the mass flow rate of air entering the system pit at a given penetration i, $c_i$ is the air's specific heat at penetration i, and $T_i$ is the temperature at penetration i. In operation, the mass flow rate of the air can be measured by thermal anemometers (incorporates thermocouples), pitot tubes, and vane anemometers. In the case of salt flow measurement, venturi flowmeter, thermal anemometer (incorporates thermocouple), activation based flow sensor (using CZT or HPGe detector), ultrasonic flow sensor, and magnetic flow sensor can be used to measure the thermal powers carried in (e.g., $\dot{Q}_{fluid,in}$) and out (e.g., $\dot{Q}_{fluid,out}$) by the molten salt (fluid). Similar detectors are available for other fluids and gases that may be relevant.

Using these equations, it can be determined that $$\dot{Q}_{core} = -(W_{FP} + W_{CP} + W_{RMTS} + W_{misc}) - \qquad (8)$$

$$\sum_{i=1}^{X} \dot{m}_i c_i T_i - \sum_{i=1}^{Y} \frac{k_i}{s_i} A_i (T_{SP,i} - T_{AT,i})$$

Given that the power input to the pumps, furnace (i.e., RTMS), sensors, and other miscellaneous systems should be known or easily measured, that the thermal conductivity of materials, material thicknesses, and area of surfaces are fixed at construction, and that the lack of pressurized air means that specific heat of air varies primarily with temperature, along with the standard assumption for ambient temperatures in the reactor bay or dirt, the parameters that must be empirically measured are the mass flow rate and temperature of air at each penetration, with AHRS output temperatures corresponding with the systems pit temperature. Any additional penetrations of the reactor enclosure would require similar measurements.

Once the thermal characteristics are empirically measured and the thermal power derived, it can be checked against the output of the NI. These sensors determine the flux at a known location, and are calibrated to give output in units of power. The results of the calculation can be used to confirm that the expected values match for a given level of uncertainty, or to adjust them to match the heat balance.

Similar calculation can be performed if the closed system is formed around the salt, with the primary difference being the change in heat due to air is primarily due to the PHRS and convection along the pipes, instead of the PHRS and AHRS, and the reactor enclosure is not part of the closed system boundary. Ideally, this would also account for heat losses from various sensors to the air that do not enter the salt. Alternately, the salt measurements can simply be used for the PHRS calculations if they would provide less uncertainty, since the heat transferred out of the salt would match the heat transferred into the air at that location.

The value determined through this method is compared to the power determined from burnup analysis of the fuel to verify the measurements. Multiple fuel samples are taken bracketing the time period when the power measurement is taken while the reactor is maintained at steady state. Through precise analysis of various fission products, decay products, and the amount of fuel present, it is possible to determine the power the reactor was outputting from the burnup. The value can be compared to both the power suggested by the NI and the heat balance as a cross check and provide an extra layer of redundancy.

One issue this method faces is that while the theoretical approach remains valid throughout the entire operational regime, accuracy limits of measurements at lower power levels, where changes in temperature are expected to be small, can produce results with significant uncertainties. The MSR is expected to remain in low power operation for at least several months, and possibly over a year, upon initial start-up as experiments are conducted before the full power operation regime will be tested. In this region, which is typically planned to reach up to 10 KW of power, the temperature change measure in the 4000 cfm circulation of the AHRS is expected to be negligible, often appearing similar at both inlet and outlet when uncertainty is accounted for, despite the PHRS being inactive at low power such that all thermal energy expected to be removed by the AHRS system. This means that practically, the method has low reliability at these low power levels, though gradual recalibration of the detectors is expected to occur as power increases to reduce uncertainty.

The most promising method for measuring reactor power at low levels, if empirical confirmation is deemed necessary in that operational regime, would be to perform a specific test using a controlled positive reactivity insertion rather than trying to monitor the calibration data online while other studies are performed. The reactor would be set to a known steady state and all parameters kept constant as a positive reactivity insertion is performed. Depending on the specific method chosen, either the temperature would be kept constant by adjusting the heat input from the furnace, or the furnace power would be kept constant while the temperature of the fuel was allowed to reach a new equilibrium. Regardless of which approach was chosen, a known reactivity insertion would produce a known change in the expected theoretical models of the flux distribution and thermal power of the reactor, which could be accounted for. This change in the calculated flux, and the measurements of the NI, could then be compared to the thermal power determined from either the change in power drawn by the furnace, which is reported by the I&C system, or the change in fuel temperature measured using thermocouples that are located on the fuel loop for other purposes which can be used with the specific heat equation for the fuel salt to determine the change in thermal power. The issue with both these methods is that both are more sensitive to minor heat losses through penetrations into the fuel loop that are not a factor with the more general approach, which treats the systems pit as a black box and analyzes air flow in and out of the overall system. In addition, the fuel salt specific heat would need to be estimated, since the presence of fission products would alter the associated parameter over the course of reactor operation. Finally, all of these experiments are expected to take some time to reach new steady states, from hours to days, consuming time that could be used for other experiments. These methods are, however, the most accurate approach for empirical measurements at low power available at this time.

The simplest way to accomplish this final approach to performing a low power calibration of the nuclear instrumentation, and the version that is currently recommended, is to move the reactor from steady state in a subcritical configuration, heated by the furnace, to a critical configuration at steady state that achieves the same temperature with the furnace shut down. The reactor is configured to operate at start-up or low power level. The furnace, as an external heat source, is used to provide sufficient energy to liquify the fuel, e.g., molten salt. The calibration procedure would begin by having the AHRS cool and RTMS heaters warm the subcritical system for long enough to reach a steady state, such that $$T_{cal} = C \qquad (9)$$

$$\frac{dT}{dt} = 0 \qquad (10)$$

where $T_{cal}$ is the temperature the system will be calibrated with, chosen for a given thermocouple, $$\frac{dT}{dt}$$

is the change in temperature over the change in time, and C is a constant value dt operators will maintain the temperature at for the thermocouple used for the calibration. Ideally, multiple thermocouples should be crosschecked, but the system should remain in steady state with $$\frac{dT}{dt} = 0$$

for all sensors, though different locations will have different constants. The process dt of reaching this steady state will take several days. Once this has been achieved, the temperature will be logged, and then the reactor will then be brought to a critical state. The next step will be slowly reducing heater power, inserting reactivity to compensate for the changes and maintain temperature at a steady state. During this process, the combination of the power generated from the reactor itself and the power from the external heat source should stay the same, as illustrated in FIG. 3. Eventually, the heater will be deactivated, eliminating it as a source of both heat and uncertainty, and the reactor will be brought to a steady state again, such that $$\frac{dT}{dt} = 0,$$

wherein dt may be expected to take at least a few hours, at least a few days, etc. Once the reactor, RTMS, and cell have reached constant temperature again, the reactor power will be known to match the initial heater power. It should be noted that the change in power distribution when comparing the furnace and the core means that, provided sufficient heating is achieved to observe significant temperature increase above ambient temperature, the temperature of the RTMS and cell should be the focus of such studies, since temperature distributions of the fuel loop itself may change due to the location of the heating source. The RTMS and cell should maintain constant temperature C, while the reactor temperature should be kept as close to the initial value as possible during reactivity adjustments. This calibration process is only sufficient at low power, where the heater power and reactor power may be matched by setting $$\frac{dT}{dt} = 0,$$

but the prediction at made using this process will enable the reactor to be brought to a higher power, where recalibration using the more general procedure is applicable, and the difficulty of measuring the absolute heat lost through the AHRS and concrete is reduced and these values will also have relatively lower impact. Once operating power has been achieved, the power obtained from the general procedure should be used for future calibration of nuclear instrumentation.

Utilizing Heat Balance Results to Perform Calibration of Nuclear Instrumentation The thermal power of the reactor core determined by the heat balance equations above, $\dot{Q}$ core, can be used to calibrate the NI. The fission chambers, uncompensated ion chambers, and ion chambers that comprise the NI are designed to measure the flux at a given point in the reactor, but output power measurements based upon initial calibration related to the theoretical normalized flux profile and expected peak flux, calculating the overall power of the core by integrating over the expected distribution with the measurement allowing proper scaling of the flux before using the proportional relationship to power to determine the figure of interest. The online calibration will ensure the output reflects the actual power of the core when the internal calculations are performed. This will also allow operators to account for drift as the core profile shifts over time due to reactions in the fuel salt and depletion.

Independent analysis using multiple different sensors can help cross-check measurements. With sufficient sensors of high enough reliability, reflected by their TRL, it is possible to determine both the air and salt heat balance, and determine whether they agree within the expected uncertainty. This is particularly helpful during start-up and low power operation, when using isotopic analysis of the fuel is difficult. A disagreement between sensor measurements would indicate that further analysis is required, but the heat balance is treated as the primary method for determining thermal power at this time.

The actual procedure for utilizing the empirically determined thermal power for calibration primarily involves inputting the information into the sensors through their electronic control. The details of the input method and internal calculations will vary by sensor and manufacturer and are beyond the scope of this disclosure at this time.

Figure 5:
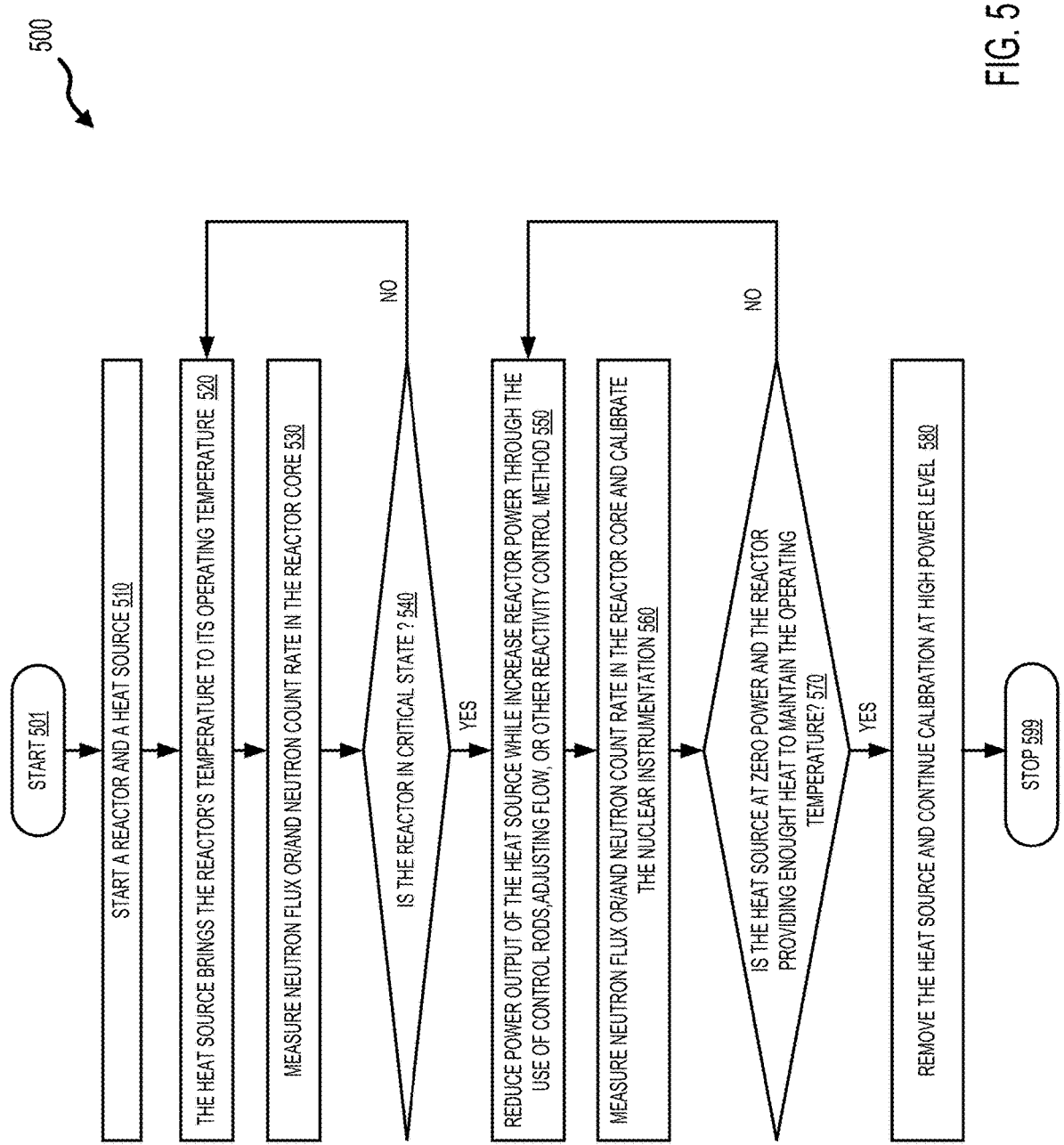
FIG. 5 depicts a flow diagram of an example calibration process at low power level.

FIG. 5 depicts a flow diagram of an example calibration process 500. The process 500 starts with 501. At step 510, a reactor starts to operate at a low power level to liquify a high-melting-point fuel (e.g., molten salt). An exemplary melting point is between 190° C. and 200° C. Some exemplary molten salt includes nitrate salt mixture such as $LiNO_3$, $KNO_3$, $CaNO_3$, and $NaNO_3$. In the present disclosure, the reactor will make use of a lithium fluoride (LiF) and beryllium fluoride (BeF) salt, commonly known as lithium-beryllium fluoride (FLiBe) with a small portion of enriched UF4. An external heat source, such as a RTMS, starts to operate and to warm the reactor to a high temperature to liquify the fuel. As discussed in FIG. 3, the RTMS is implemented as an integral thermal insulation enclosure ("furnace") and its energy input is mainly provided by heaters 306a-d.

At step 520, with the reactor in a subcritical state, the heat source provides external energy to warm the reactor, increasing its temperature to the operating temperature.

At step 530, NI is used to measure neutron flux or neutron count rate in the reactor. For example, the NI can include two fission chambers that are located outside the RTMS but within the reactor enclosure. Based on the measurement of neutron flux or neutron count rate, the NI can further output the reactor power. In the present disclosure, the NI can communicate the measurements to a remotely located I&C system for processing through one or more communication links.

At step 540, the I&C system can use the measurement of neutron flux or neutron count rate to determine whether or not the reactor is in a critical state. If the reactor is in a critical state, the process 500 proceeds to step 550. Otherwise, the process 500 returns to step 520.

At step 550, the I&C is configured to reduce the power output of the external heat source, e.g., heaters 306a-d of the RTMS as illustrated in FIG. 3, by a predetermined amount. In the meantime, the I&C system can operate the reactor to increase its own power through the use of control rods, adjusting flow, or other reactivity control methods. The predetermined amount of the reduced power is compensated by the increased reactor power created by the changes of one or more reactivity control settings, such as the control rod positions, pump power, and flow rate, so that the reactor's temperature is maintained at a steady state. At the steady state, the change in temperature over the change in time is zero and the reactor temperature is maintained at a constant value, as discussed in equations (9) and (10).

At step 560, NI is used to measure neutron flux or neutron count rate in the reactor. For example, the NI can include two fission chambers that are located outside the RTMS but within the reactor enclosure. Fission chambers are very sensitive to neutrons, allowing it to operate in relatively higher gamma fields compared to ordinary ion chambers. They can also handle a wide range of power using different modes. Therefore, the fission chambers are primarily used for start-up and low power operations. Based on the measurement of neutron flux or neutron count rate, the NI can output the reactor power and communicate the measurements to the I&C system. The I&C system is configured to compare the power output of the NI with the thermal power of the reactor calculated by equation (8). If there is a difference beyond an expected level of uncertainty, the NI can be appropriately calibrated. In operation, especially in the startup and low power operations, the power increment in the reactor with each step (i.e., Step 550) is determined by tracking the power changes in the external heat source while keeping all other variables constant and letting the reactor reach thermal equilibrium for each step, such that the increased reactor power matches the decreased power of the external heat source if the temperature the NI is calibrated at is maintained stable, at a constant value.

At step 570, if the external heat source is at zero power and the reactor is providing all the heat to maintain its operating temperature, the process 500 proceeds to step 580. Otherwise, the process 500 proceeds to step 550 to continue reducing the power output of the external heat source and increasing the power generated by reactor itself.

At step 580, the I&C system is configured to deactivate the external heat source (e.g., heaters 306*a*-*d* of the RTMS as illustrated in FIG. 3) when the power output of the external heat resource is zero. The reactor itself can provide sufficient power to maintain its operating temperature and operate in a steady state. Then the NI can continue to measure the neutron flux or neutron count rate, outputting the reactor power, and then calibrated its sensors at high power level based on comparison with the thermal power calculated by equation (8). The process 500 then stops at step 599.

Figure 6:
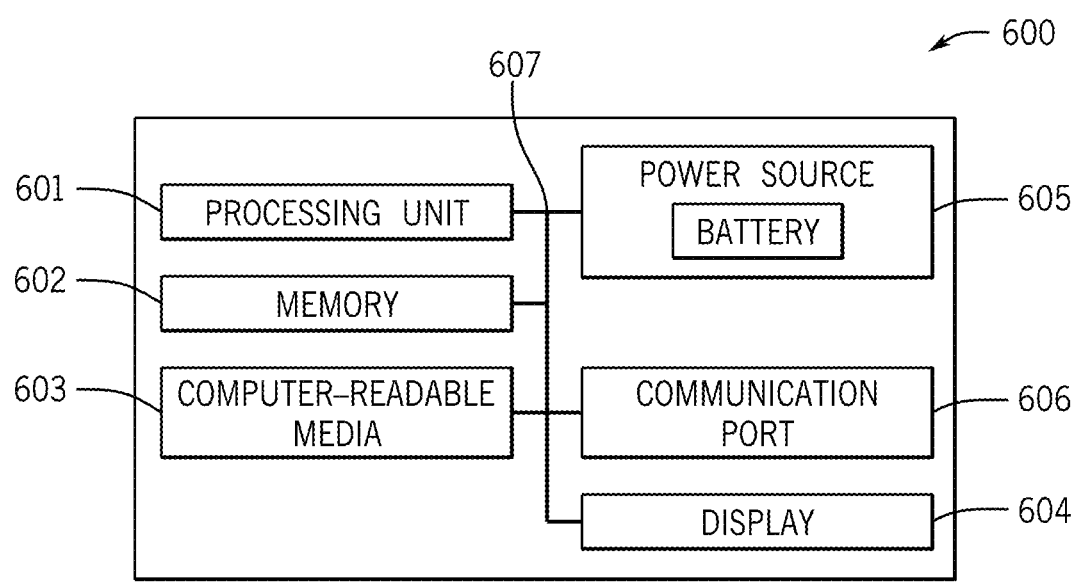
FIG. 6 depicts a functional block diagram of a computing system.

FIG. 6 depicts a functional block diagram of a computing system 600. The schematic representation in FIG. 6 is generally representative of any types of systems and configurations that may be used to receive and process the various signals from the NI and sensors described herein. For example, the computing system 600 may be used with or included within the NI and the I&C system, and to perform any of the functions described herein. In this regard, the computing system 600 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 6, the computing system 600 may include a processing unit or element 601 operatively connected to computer memory 602 and computer-readable media 603. The processing unit 601 may be operatively connected to the memory 602 and computer-readable media 603 components via an electronic bus or bridge (e.g., such as system bus 607). The processing unit 601 may include one or more computer processors or microcontrollers that are configured to perform operations in response to computer-readable instructions. The processing element 601 may be a central processing unit of the computing system 600. Additionally or alternatively, the processing unit 601 may be other processors within the device including application specific integrated chips (ASIC) and other microcontroller devices.

The memory 602 may include a variety of types of non-transitory computer-readable storage media, including, for example, read access memory (RAM), read-only memory (ROM), erasable programmable memory (e.g., EPROM and EEPROM), or flash memory. The memory 602 is configured to store computer-readable instructions, sensor values, and other persistent software elements. Computer-readable media 603 may also include a variety of types of non-transitory computer-readable storage media including, for example, a hard-drive storage device, a solid state storage device, a portable magnetic storage device, or other similar device. The computer-readable media 603 may also be configured to store computer-readable instructions, sensor values, and other persistent software elements.

In this example, the processing unit 601 is operable to read computer-readable instructions stored on the memory 602 and/or computer-readable media 603. The computer-readable instructions may adapt the processing unit 601 to perform the operations or functions described above with respect to FIGS. 1-5. The computer-readable instructions may be provided as a computer-program product, software application, or the like.

As shown in FIG. 6, the computing system 600 may also include a display 604. The display 604 may include a liquid-crystal display (LCD), organic light emitting diode (OLED) display, light emitting diode (LED) display, or the like. If the display 604 is an LCD, the display may also include a backlight component that can be controlled to provide variable levels of display brightness. If the display 604 is an OLED or LED type display, the brightness of the display 604 may be controlled by modifying the electrical signals that are provided to display elements.

The computing system 600 may also include a battery that is configured to provide electrical power to the components of computing system 600. The battery may include one or more power storage cells that are linked together to provide an internal supply of electrical power. In this regard, the battery may be a component of a power source 605 (e.g., including a charging system or other circuitry that supplies electrical power to components of the computing system 600). The battery may be operatively coupled to power management circuitry that is configured to provide appropriate voltage and power levels for individual components or groups of components within the computing system 600. The battery, via power management circuitry, may be configured to receive power from an external source, such as an AC power outlet or interconnected computing device. The battery may store received power so that the computing system 600 may operate without connection to an external power source for an extended period of time, which may range from several hours to several days.

The computing system 600 may also include a communication port 606 that is configured to transmit and/or receive signals or electrical communication from an external or separate device. For example, in the present disclosure, the computing system 600 in the I&C system is configured to transmit and/or receive signals or electrical communication representing measurements from the NI and sensors in the MSR. The communication port 606 may be configured to couple to an external device via a cable, adaptor, or other type of electrical connector. In some embodiments, the communication port 606 may be used to couple the computing system 600 with a computing device and/or other appropriate accessories configured to send and/or receive electrical signals. The communication port 606 may be configured to receive identifying information from an external accessory, which may be used to determine a mounting or support configuration. For example, the communication port 606 may be used to determine that the computing system 600 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A method for calibrating nuclear instrumentation of a reactor, the method comprising
    starting the reactor and a heat source, the heat source comprising a heater;
    subsequent to the starting, heating, by using the heater, the reactor to an operating temperature;
    subsequent to the heating, determining whether the reactor is in a critical state;
    in response to a determination of the reactor being in a critical state, repeating steps of
        reducing the power of the heater by a predetermined amount;
        increasing the power of the reactor by changing one or more reactivity settings;
            wherein the reducing of the power of the heater and the increasing of the power of the reactor are coordinated to compensate the reduced power from the heater by using the increased power generated by the reactor until the reactor reaches thermal equilibrium;
        subsequent to the increasing, calculating the power of the reactor based on a heat transfer function of a plurality of parameters of the reactor;
        subsequent to the increasing, measuring, by the nuclear instrumentation, the power of the reactor;
        subsequent to the calculating and measuring, calibrating the nuclear instrumentation based on the calculated power of the reactor and the measured power of the reactor;
        subsequent to the calibrating, determining the power of the heater is zero and the temperature of the reactor is the operating temperature; and
        in response to a determination of the power of the heater being zero and the temperature of the reactor being the operating temperature, deactivating the heater.

2. The method of claim 1, wherein the reactor is a molten salt reactor.

3. The method of claim 1, wherein the heater is an external energy source outside the reactor's internal vessel.

4. The method of claim 1, wherein the reducing the power of the heater and the increasing the power of the reactor are performed at the same time.

5. The method of claim 1, wherein the reactivity settings comprise control rod positions, pump power, and flow rate.

6. The method of claim 1, wherein the nuclear instrumentation comprises two uncompensated ion chambers, two compensated ion chambers, and two fission chambers.

7. The method of claim 1, wherein the nuclear instrumentation is configured to
    measure neutron flux or neutron count rate; and
    measure the power of the reactor based on the measurement of neutron flux or neutron count rate.

8. The method of claim 1, wherein the power of the reactor is calculated based on the heat transfer function of the plurality of parameters measured by a plurality of sensors mounted throughout the reactor, the plurality of parameters comprising energy input from a fuel salt pump, energy input from a coolant salt pump, energy input from the heater, sum of energy released by the one or more sensors, thermal energy carried in by gas and fluid, thermal energy carried out by gas and fluid, and thermal energy carried out through concrete cases of the reactor.

9. The method of claim 1, wherein the heating of the reactor by using the heater further comprises
    pausing the heater in response to a determination of the temperature of the reactor reaches a threshold temperature; and
    resuming the heater in response to a determination of the temperature of the reactor drops below the threshold temperature.

10. The method of claim 1, wherein the repeating steps stop in response to a determination of the power of the heater being zero and the temperature of the reactor being the operating temperature.

* * * * *